United States Patent [19]
Kitahata

[11] Patent Number: 5,172,448
[45] Date of Patent: Dec. 22, 1992

[54] MOLDED BUFFER PAD

[75] Inventor: Roy S. Kitahata, Fullerton, Calif.

[73] Assignee: Waxing Corporation of America, Orange, Calif.

[21] Appl. No.: 675,493

[22] Filed: Mar. 26, 1991

[51] Int. Cl.$^5$ .................. B24D 13/14; B24B 29/00; B60S 3/06

[52] U.S. Cl. ..................... 15/230; 15/97.1; 15/97.3; 51/170 T

[58] Field of Search ............ 15/97.1, 98, 230, 230.12, 15/230.17, 97.2; 51/170 T, 177, 170 TL, 170 MT

[56] References Cited

U.S. PATENT DOCUMENTS

| | | |
|---|---|---|
| 1,609,508 | 12/1926 | Cavicchi . |
| 1,954,977 | 4/1934 | Albertson ........................ 247/13 |
| 2,173,350 | 9/1939 | Bissell ........................... 91/39 |
| 2,759,305 | 8/1956 | Helbig ........................... 51/170 |
| 3,395,417 | 8/1968 | Matouka ......................... 15/230 |
| 3,418,675 | 12/1968 | Meguiar et al. .................. 15/230 |
| 3,520,090 | 7/1970 | Lee .............................. 51/170 |
| 3,531,812 | 10/1970 | Bailey et al. .................... 15/97.1 |
| 4,188,682 | 2/1980 | Burglin et al. .................. 15/97 |
| 4,523,411 | 6/1985 | Freerks ........................ 51/170 MF |
| 4,791,694 | 12/1988 | Itaya et al. .................... 15/97.1 |
| 4,965,905 | 10/1990 | Kitahata et al. ................. 15/97.1 |

Primary Examiner—Edward L. Roberts
Attorney, Agent, or Firm—Fitch, Even, Tabin & Flannery

[57] ABSTRACT

Disclosed is a rotary buffer pad assembly comprising a pan-like holder to the outer surfaces of which a resilient pad of foamed polyurethane is directly molded for better dynamic balance.

3 Claims, 1 Drawing Sheet

MOLDED BUFFER PAD

This invention relates to powered buffers, and particularly to a buffer pad assembly for use in orbital buffers.

BACKGROUND OF THE INVENTION

Buffer pads as heretofore constituted for use in orbital buffers have consisted of a shallow pan-like pad holder, and a pad attached thereto, mounted for free rotation on the eccentric, orbiting axis of the buffer rotor. The pad, typically of foamed plastic material cut to size, was secured by adhesives to the outer surface of the pan-like pad holder. An illustrative buffing pad assembly is shown by U.S. Pat. No. 4,188,682, issued Feb. 18, 1980.

A problem associated with the fabrication of buffing pads by assembly from individual preformed components, viz., the preformed pan and the precut foam pads assembled with it by means of adhesives, is the difficulty of achieving and maintaining dynamic balance and the resulting greater difficulty of controlling the orbital polisher wielded free hand by the workman.

SUMMARY OF THE PRESENT INVENTION

The present invention overcomes the difficulty of achieving dynamic balance by the molding of the plastic foam pad directly to the outer surfaces of the preformed pad holder as an integral structure, rather than as an assembly of individual premanufactured parts.

BRIEF DESCRIPTION OF THE DRAWINGS

The buffer pad assembly of the invention is illustrated in the accompanying drawings, in which:

FIG. 2 is a plan view of the assembly showing the section line along which FIG. 1 is taken.

DESCRIPTION OF THE PREFERRED EMBODIMENT

The buffing pad assembly 10 of the invention in preferred form is, as earlier noted, the integrated assembly of the two major parts, namely, a pan-like pad holder 12 and, molded directly thereto, a unitary pad 14 of foamed plastic material, preferably polyurethane.

The pan-like pad holder 12 is preferably die cast for the more precise distribution of material and the elimination of any necessity for further machining to prepare the pad holder to receive the additional parts assembled with it, principally the pad 14 subsequently to be molded to the pad holder and the anti-friction bearings 16 by means of which the pad assembly is journaled on the orbiting axis of the buffer rotor.

The material used is zinc or a zinc alloy of comparable, relatively low melting temperature suited to die casting and having an adequate strength to weight ratio to maintain the weight of the pad assembly within reasonable limits for a hand-held power tool of prolonged use. Rigid plastic may also be suitable to the application with some revision of wall thicknesses, and appropriate selection of materials in view of the heat accumulation during prolonged use.

Figure 1:
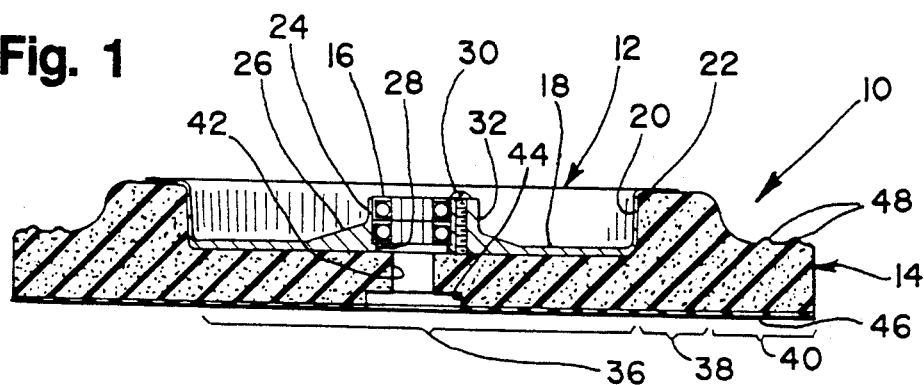
FIG. 1 is a cross-sectional elevation of the pad assembly.
Figure 3:
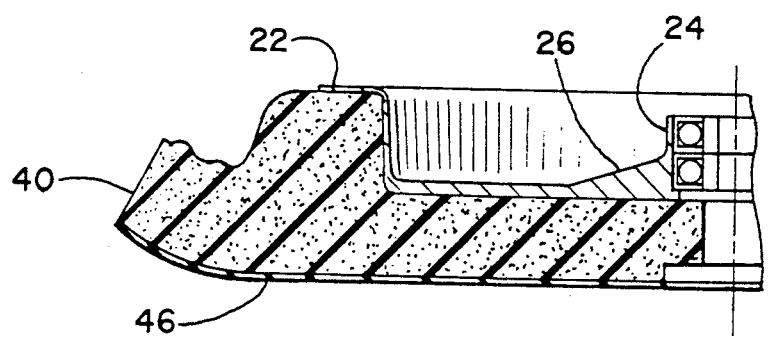
FIG. 3 is an enlarged partial cross section of the pad assembly similar to FIG. 1, and illustrating the flexibility of the pad lip.

The pan-like pad holder 12 comprises a circular bottom plate section 18 having an upstanding annular wall section 20 at its periphery, and an outwardly extending ring flange section 22 at the upper end of the annular wall section. A cylindrical hub 24 rises from the center of the upper surface of the base plate section, which is stiffened by a plurality of web-like ribs 26 which radiate equispaced from the central hub to merge with the upstanding annular wall section 20 of the pad holder. As seen in FIGS. 1 and 3, the ribs 26 become shallower as they radiate outwardly from their juncture with the hub.

Figure 2:
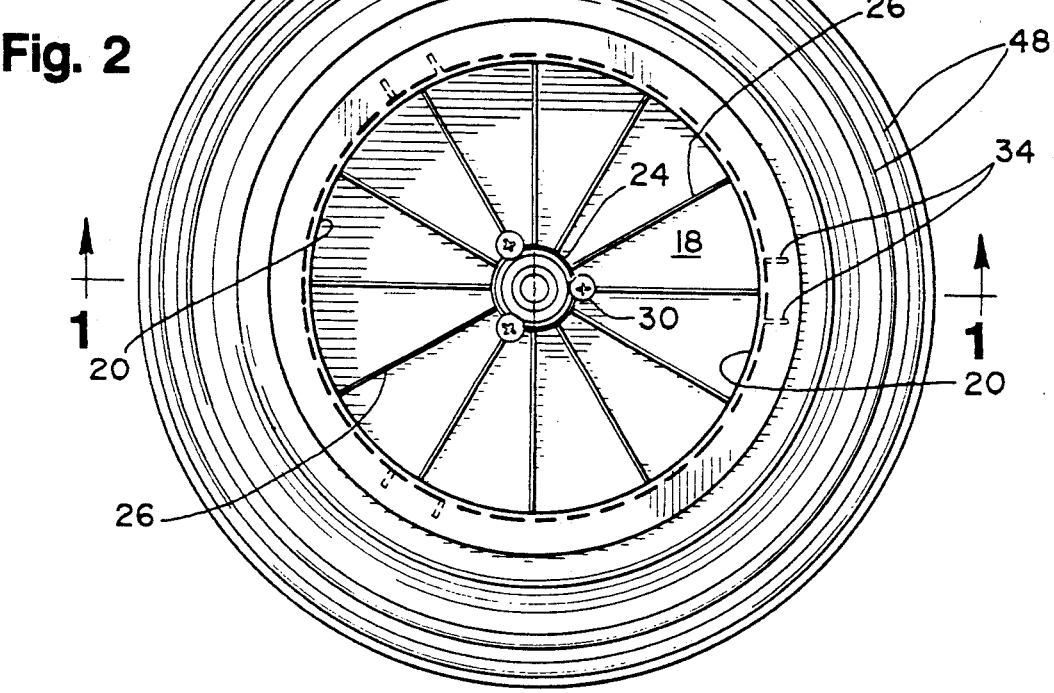

The hub 24 itself is cored to provide a central opening for the anti-friction bearings 16, actually a pair of ball bearings stacked by their outer races upon a shoulder 28 at the bottom of the central opening and maintained in assembled relation with the pad holder by the overlapping engagement of the heads of three cap screws 30 with the outer race of the upper bearing. The cap screws are received in screw holes cored in three bosses 32 which are equally spaced about the periphery of the hub, each merging with one of the several radiating ribs 26, as seen in FIGS. 1 and 2. The bearing-retaining cap screws 30 are preferably of the self-tapping type and may, as shown, have round heads adapted to receive a Phillips screw driver.

As shown by dotted lines in FIG. 2, the ring flange section 22 of the pad holder 12 is stabilized by a number of web-like braces or fins 34 on the underside of the ring flange integral therewith and with the annular wall section 20 down to its juncture with the base plate section 18. These fins 34, positioned in three equally spaced pairs, flank the axis of the ribs 26 radiating from the retaining screw bosses 32 of the central hub, stiffening the ring flange 20 against bending loads occasioned during normal use of the pad assembly, and also serving as a keying interlock between the pad holder 12 and the molded-on pad 14 to resist shear forces tending to separate them while the buffing pad is in use.

As earlier noted, the resilient polyurethane pad 14 is molded to the outer surfaces of the pad holder 12, which, before assembly with the central bearings 16, is inserted into the mold in which the pad itself is cast. To enhance the adhesion of the pad holder and the pad, the outer surfaces of the pad holder 12 are preferably slightly erose, a finish readily achievable by etching those surfaces of the die-casting mold from which the outer surfaces of the pad holder take shape. With the pad holder inserted into and centered in the pad-casting mold, the intermixed liquid resin and isocyanate ingredients of the urethane pad material are poured into the mold, where the mixture is expanded by self-contained blowing agents released by the heat of polymerization as the molecular cross-linking proceeds, until the entire mass is pressed firmly against the walls of the mold. All surfaces of the mold excepting the pad holder are treated with a suitable release agent to confine the adhesion of the polyurethane to the pad holder.

As will be noted from the cross-sectional view of FIG. 1, the buffing pad 14, molded as described onto the pad holder, comprises a central circular sole portion 36 of uniform thickness immediately beneath the base plate section 18 of the pad holder, a surrounding ring portion 38 of greater thickness determined by the depth of the annular wall section 20 of the pad holder, and, surrounding the ring portion, an outer annular lip portion 40 of lesser thickness than the ring portion, and whose upper surface merges with that of the ring portion 38 in a smooth S-curve configuration. The underside of all three portions of the pad collectively constitute a smooth, circular, plane working surface perpendicular to the central axis of the buffer pad assembly, at the site of which the integral pad is cored at 42 to receive the head of a cap screw, not shown, used to secure the inner races of the ball bearings to the eccentric buffer rotor to mount the buffer pad assembly on the orbiting axis of the rotor.

The constituents of the polyurethane foam are chosen in character and amount to result in a cellular foam structure which is predominantly closed cell in nature, and which has a density of approximately four pounds per cubic feet, viz., foam which is firm but not rigid, and which is resilient enough to permit the resilient compression of its working undersurface to conform to convex contours and also to permit the upward bending of the peripheral lip portion 40 of the pad to accommodate the working of the rotating pad into concave contours of an autobody, and close to its chrome trim, as well as simply to adapt itself to the professional buffer's technique of working with the working surface of the pad tilted a few degrees from parallel with the surface being treated.

Because of the greater density of foam experienced in the area immediately surrounding the cored central opening through which the pad assembly is mounted on the orbiting axis of the buffer rotor, the central opening of the pad is preferably countercored, as at 44, so that the stiffer foam surrounding the cored central opening 42 is elevated from the sole plane, of the buffing pad 14 to avoid a local hard spot at the center of the working surface of the pad.

Because it may be difficult to achieve a uniform, closed-cell foam at the working surface of the buffing pad 14, it may be desirable to insert in the pad mold a plastic film 46 of polyethylene or the like, to seal the working surface of the pad against the intrusion of an unbalancing accumulation of polishing materials which migrate to the pad surface through its covering bonnet during normal use of the pad.

In use, of course, the pad is encased in a bonnet, not shown, of material of suitable buffing texture, typically a circular section of terry cloth having an endless elastic band enclosed within a peripheral seam to draw the textile material into bonnet form, and to maintain the bonnet assembled with the pad. To assist in maintaining that assembly, the peripheral lip portion 40 of the pad 14 is provided on its upper surface with a series of upwardly protruding retainer rings 48 which provide successive barriers or gripping ridges for cooperation with the elastic retaining band of the removable and replaceable bonnet.

The pad assembly 10 disclosed herein is an improvement over preexisting pad assemblies for similar service because its principal constituent parts are precision molded in sequence, i.e., first the die cast pad holder 12 and then the resilient foamed plastic pad 14, molded directly to the pad holder in a manner which permits the inherently balanced precision die cast pad holder 12 to be accurately positioned as a central insert within the mass of the foam pad 14 to which it becomes intimately united in the pad forming process.

The features of the invention believed new and patentable are set forth in the appended claims.

What is claimed is:

1. A buffer pad assembly for use in treating the exterior surfaces of automobiles or the like, comprising:
    a pad holder of pan-like configuration comprising a circular plate section having an upstanding central hub, an annular well section rising from the plate section at the periphery thereof, and an annular flange section extending radially outwardly from said wall section, said several sections and hub being molded integrally of the same material as a unitary body;
    an integral circular pad of resilient plastic material molded onto the outer surfaces of said pad holder concentrically therewith, said pad having a sole portion of constant thickness beneath the plate section of the pad holder, a thicker ring portion radially outwardly of said annular wall section and sole portion and beneath said annular flange section, and an annular lip portion of lesser thickness than said ring portion at the periphery of the pad, all portions of the pad collectively presenting a circular working surface in a plane perpendicular to the axis of said hub;
    said resilient plastic pad being formed of foamed polyurethane foamed in place about the exterior surfaces of the pad holder and about a central core to provide therein a central opening on the axis of the pad holder hub, said pad also being countercored to elevate the locally densified plastic material surrounding said central opening above said working surface of the pad; and
    means within said hub for mounting said pad assembly in driving relation to a buffer.

2. The buffer pad assembly of claim 1 wherein the foamed polyurethane pad has an average density of four pounds per cubic foot, and said working surface is covered by an adhering liquid-impervious plastic film.

3. The buffer pad assembly of claim 2 wherein the liquid-impervious plastic film is adhered to the foamed polyurethane during the foaming process.

* * * * *

UNITED STATES PATENT AND TRADEMARK OFFICE
CERTIFICATE OF CORRECTION

PATENT NO. : 5,172,448
DATED : December 22, 1992
INVENTOR(S) : Roy S. Kitahata It is certified that error appears in the above-identified patent and that said Letters Patent is hereby corrected as shown below:

column 3, line 28, delete the comma after "plane."

IN THE CLAIMS:

column 4, line 16, change "well" to --wall--.

Signed and Sealed this

Eighth Day of February, 1994

BRUCE LEHMAN

Attest:

Attesting Officer      Commissioner of Patents and Trademarks